United States Patent Office 3,253,636
Patented May 31, 1966

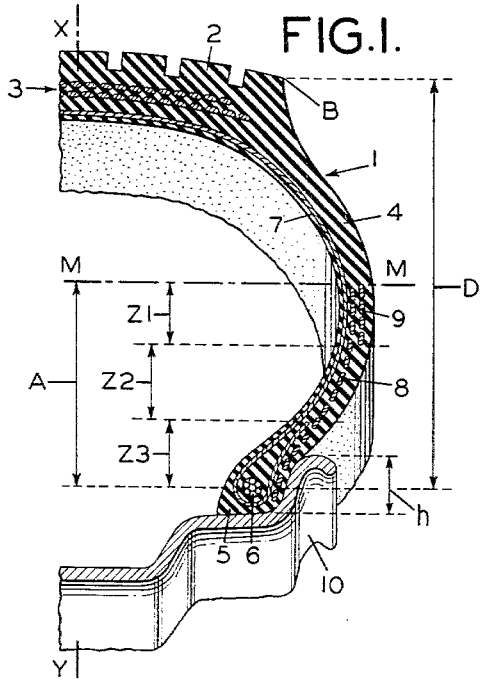
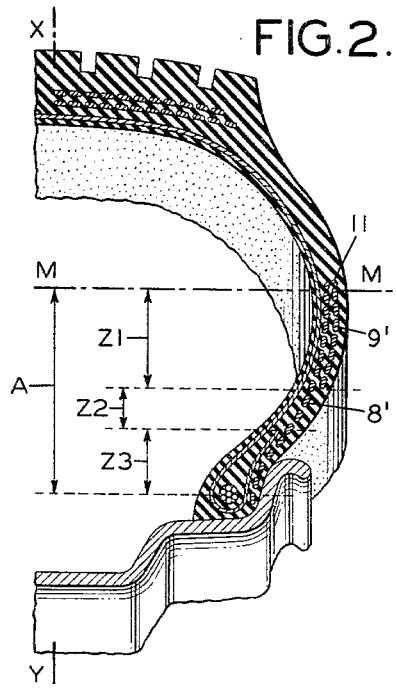
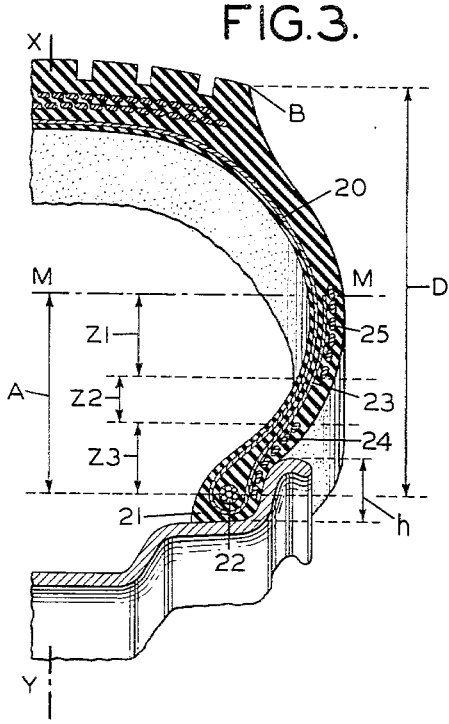
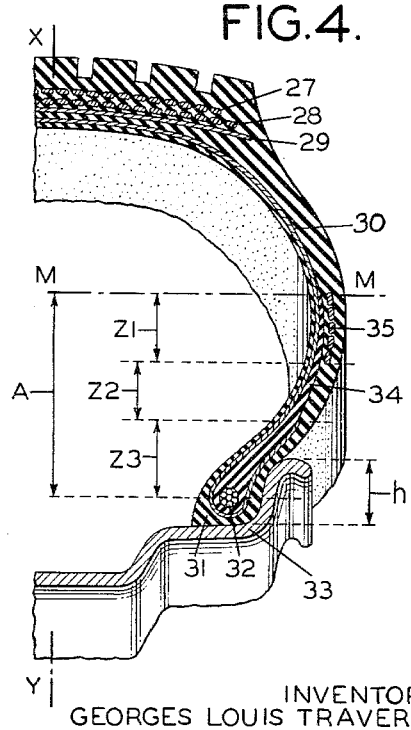

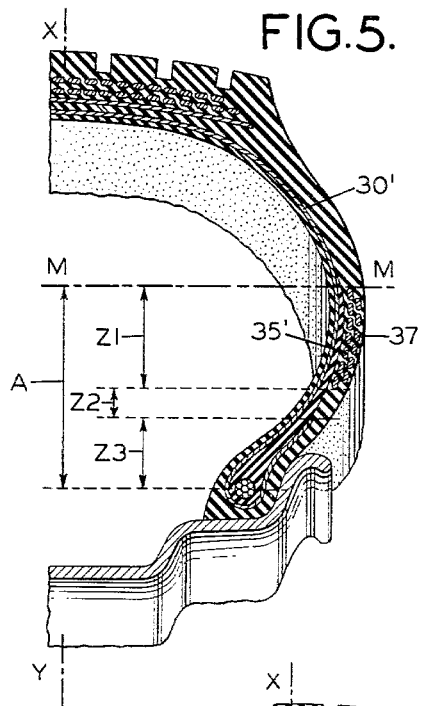
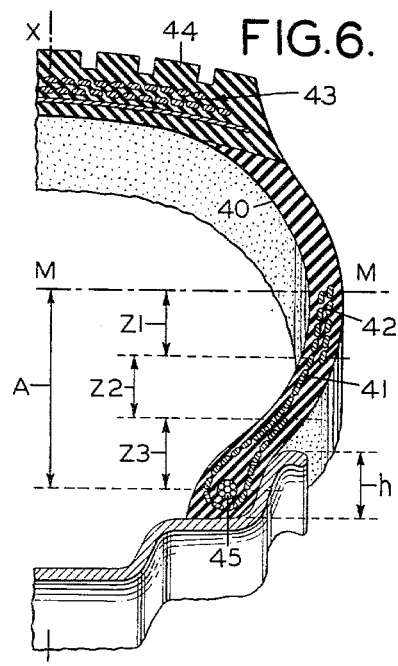
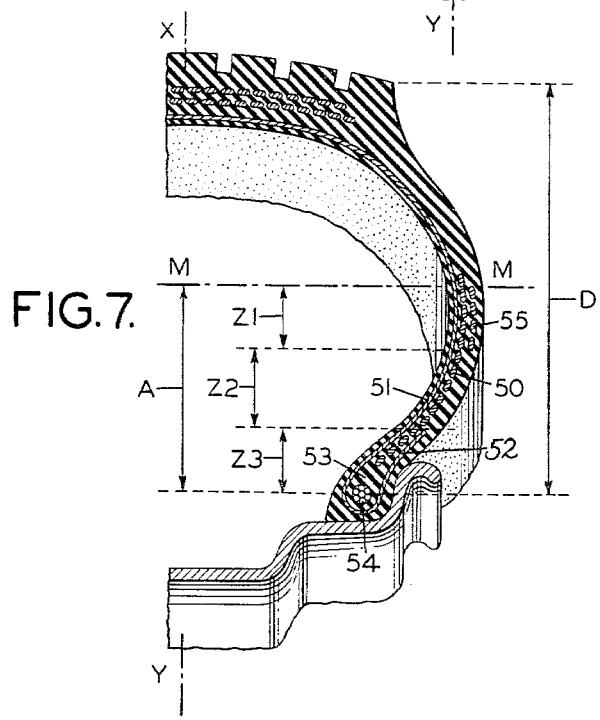

3,253,636
PNEUMATIC TIRES
Georges Louis Travers, Clermont-Ferrand, France, assignor to Compagnie Generale des Etablissements Michelin, raison sociale Michelin & Cie, Clermont-Ferrand, France
Filed June 30, 1964, Ser. No. 379,243
Claims priority, application France, July 4, 1963, 940,437; Apr. 13, 1964, 970,783
12 Claims. (Cl. 152—354)

This invention relates to improvements in pneumatic tires of the type having a tread having a reinforcement consisting, for example, of crossed cables and/or layers of natural or synthetic elastomers with a high modulus of elasticity, and particularly to the sidewall structures of such tires.

The sidewalls of tires of the type mentioned usually are reinforced with plies of radial or substantially radial cables or a layer of an elastomer with a high modulus of elasticity. The rigidity or, conversely, the resilience or flexibility of the sidewalls of most of such tires is practically uniform throughout their width.

In order to increase the roadability of such tires, particularly at high speeds, the lower or inner half portion of each sidewall, i.e., the portion of the sidewall extending from the bead to a line located at about half the distance between the bead and the corresponding edge of the tread, may be made more rigid than the upper or outer half portion of each sidewall.

Such tires provide a comfortable ride and have excellent roadability but are somewhat difficult to mount on drop-center wheel rims because of the rigidity of the lower or inner portion of their sidewalls.

In accordance with the invention, the sidewalls of tires having cables and/or high modulus elastomer tread reinforcements are modified to obtain a novel distribution of the sidewall reinforcing means in that part of the sidewalls extending between their beads and their mid-height in order to retain the roadability and comfort of the prior tires and afford greatly improved ease of mounting on a drop-center rim and durability.

More particularly, in tires embodying the invention, the lower or inner half portions of the sidewalls are reinforced to a greater extent than their upper or outer half portions, with the lower half portion containing a middle zone which is reinforced to a lesser extent than the zones on either side of it. Thus, the invention provides, in each sidewall, i.e., from the tread edge to the bead, four zones of different rigidities or flexibilities. These zones are (1) an upper half-portion of each sidewall having very little rigidity, (2) a circumferentially practically inextensible zone adjacent the mid-height of the sidewall, (3) a relatively rigid bead zone, and (4) a middle zone between the bead zone and the inextensible zone which is more rigid than the upper half-portion but substantially less rigid than the two zones on either side of it.

The less rigid zones of the sidewalls provide a comfortable ride without appreciably affecting roadability. Moreover, the middle zone of the lower or inner half of the sidewall which is less rigid than the two zones on either side of it, can be deformed or flexed to facilitate the passage of the tire over the rim flange. The zones (2) and (3) which are circumferentially practically inextensible provide excellent road holding ability at high speeds. It can be appreciated, therefore, that the sidewalls of a tire according to the invention are composed of several coacting zones, each of which has a structure causing it to adequately fulfill a special function in the sidewall.

For a better understanding of the invention, reference may be had to the accompanying drawings, in which FIGURES 1 to 7 are cross-sectional views through portions of tires embodying the invention mounted on drop-center wheel rims.

In all the figures, the line M—M is located at about half the distance D between the edge of the tread B and the bead wire, while the axis X–Y is the plane of symmetry of the tire. The lower or inner half-portion of each sidewall of the new tires shown by the bracket A contains, according to the invention, three zones, i.e., an upper zone Z1, a middle zone Z2 and a lower or bead zone Z3. The widths of the zones Z1 to Z3 are susceptible to variation, e.g., the inner zone Z1 can be between about $3/10$ and $4/10$ of the width of sidewall portion A, the middle zone Z2 can be between about $1/6$ and $1/2$ the width of portion A and the upper zone Z3 can be between about $1/4$ and $1/2$ of the width of the portion A.

The cables mentioned herein may be textile (natural, artificial or synthetic), metal or glass cables.

As shown in FIGURE 1, a typical tubeless or tube-containing tire 1 embodying the invention includes a tread 2 reinforced by two superimposed plies 3 of cables which are inclined with respect to the axis X–Y, two sidewalls 4 (only one being shown) ending in a bead 5 containing the usual bead wire 6. The sidewalls are reinforced from bead to bead by radial cables 7 extending behind the tread reinforcing plies 3. The ends of the cables 7 are turned up around the bead wire 6 and extend upwards through the zone Z3, the width of which is approximately 120% of the height $h$ of the flange of the drop-center rim 10 as defined by current standards or about one-third of the width of the lower half portion or zone A of the tire.

A ply 8 of inclined cables extends between the line M—M and the bead wire 6, close to the radial cables 7. Another ply 9 of inclined cables crosses the cables of the ply 8 and extends over about one-fourth the width of the lower half portion, zone A, of the sidewall. The inclinations of the cables in the plies 8 and 9 are between about 10° and 40°.

The modification disclosed in FIGURE 2 differs from the tire 1 in that the ply 9' (in zone Z1) extends over about half the width of the zone A and is obtained by folding the upperportion of ply 8' along the line 11 downwardly into substantially parallel relation to itself.

The tire shown in FIGURE 3 differs from the tires shown in FIGURES 1 and 2 in that it includes radial cables 20 extending throughout the sidewall and folded in the bead 21 around the bead wire 22 to form a ply 23 extending to about the mid-height of the sidewall (line M—M). The circumferential inextensibility of the zone Z1 is increased, as compared with that of the zone Z2, by an additional ply of inclined cables 25, the width of which is about one-fourth to one-half of the width of zone A. The zone Z3 is made more rigid than the middle zone Z2 by means of an additional ply of inclined cords 24.

The modified tire disclosed in FIGURE 4 comprises a tread reinforcement composed of three cable plies 27, 28 and 29 and a carcass ply 30 of radial cables folded in the bead 31 around the bead wire 32 and extending over the zone Z3, the width of which is about 130% the height $h$ of the rim flange 33 as defined by current standards (about 40% of the width of the zone A). A layer 34 of an elastomer having a modulus of elasticity of between about 800 grams and 8000 grams per square millimeter at 100% elongation is provided between the line M—M and the bead wire 32 along the radial ply 30. A narrow ply 35 of inclined cables extends axially outside the layer 34 over the zone Z1 which covers about one-third of the zone A.

The tire shown in FIGURE 5 differs from that shown in FIGURE 4 in that it includes a ply 35' of inclined cables extending over about half the width of the sidewall portion or zone A, this ply being flanked by another ply 37 of cables crossing those of the ply 35'. The angles of the plies 35' and 37 may be symmetrical or not with respect to the radial cables 30'. The width of the reinforcing zone Z3 is reduced to about one-third of the width of zone A.

Another tire shown in FIGURE 6 and embodying the invention includes under its tread 44 a reinforcement 43 made up of three superimposed cable plies. Its sidewalls 40 have in their upper approximately half portions no cable reinforcements and the sidewalls are composed of an elastomer, the modulus of elasticity of which is 800 gr./mm.$^2$ (100% elongation). Rubber or other elastomer having a modulus higher than 800, e.g., up to 8000 gr./mm.$^2$, can be used. In the lower or inner portion A of each sidewall, the three zones Z1, Z2 and Z3 of variable rigidity are obtained by providing over the entire extent of the zone A a ply 41 of inclined cables turned up around the bead wire 45 and extending throughout the zone Z3 which is about 120% of the height $h$ of the rim flange as defined by current standards (one-third of the width of the zone A). In the zone Z1 the width of which is, in the present instance, about one-third the height A, the desired circumferential inextensibility is obtained by including a ply 42 of inclined cables.

The tire shown in FIGURE 7 has proved to be particularly satisfactory. It differs from the tire illustrated in FIGURE 1 only by disposing the lower edge of the ply 50 (corresponding to ply 8 in FIGURE 1) between the main ply 51 and its turned-up edge 52. With the layer 50 thus located, the bond between the cables of this ply and the surrounding rubber is very much improved. Preferably, the upper end of the ply 50 is located slightly above the line M—M and the upper end of the ply 55 of inclined cables which corresponds to the ply 9 in FIGURE 1.

The strip 53 of elastomer above the bead wire 54 and between the ply 51 and its turn-up 52 can have a high modulus of elasticity, for example, between about 350 gr./mm.$^2$ and 8000 gr./mm.$^2$ at 100% elongation.

It will be understood that in all the above-described tires and in accordance with the invention, the middle zone Z2 is more flexible and extensible than the two adjacent zones Z1 and Z3 which both must be relatively rigid and inextensible, and that the upper half portion of the sidewall is more flexible than any of the zones Z1 to Z3 for the reason that it contains only radial cables or is devoid of cables.

The height of the zone Z1 is in all cases equal to about one-fourth to one-half the height of the zone A, the height of the zone Z2 amounting to between one-sixth and one-half the height of the zone A. Finally, the height of the zone Z3 is approximtaely one-third to two-fifths of the height of zone A or, in other words, corresponds to about 120% to 130% of the height $h$ of the rim flange as defined by the current standards.

Many other variations of the tire structure are within the scope of the present invention. For example, the longitudinal inextensibility of the zone Z1 can be obtained by using instead of the cable plies 9, 9', 10, 25 or 55 a layer consisting exclusively of an elastomer with a modulus of elasticity greater than that of the elastomer used in the other parts of the sidewall, e.g., 350 to 8000 gr./mm.$^2$ at 100% elongation.

The angles of the inclined cables is between about 10° and about 40° as measured with respect to a plane perpendicular to the plane of the radial section of the tire going through the point where measured.

Accordingly, the forms of the invention described above should be regarded as illustrative, and the invention is not limited except as defined in the following claims.

I claim:

1. A pneumatic tire comprising a ply reinforced tread, sidewalls extending inwardly from opposite edges of said tread and beads at the inner edges of said sidewalls, reinforcements of different rigidities in said sidewalls, comprising at least one reinforcement extending from each bead throughout each sidewall to at least the adjacent edge of said tread, another reinforcement extending throughout about the inner one-half portion of each sidewall rendering it more rigid than the remaining outer portion of said sidewall, and additional reinforcements in an inner zone and an upper zone of said inner one-half portion said additional reinforcements rendering a middle zone of said inner portion between said upper and said inner zones less rigid than said upper zone and said inner zone.

2. The tire set forth in claim 1 in which said inner zone is between about three tenths and four tenths of the width of said inner portion, said upper zone is between about one quarter and one half of the width of said inner portion and said middle zone is between one sixth and one half of the width of said inner portion.

3. The tire set forth in claim 1 in which the reinforcements in said inner portion of each sidewall comprise at least one ply of cables inclined relative to the radii of said sidewall.

4. The tire set forth in claim 1 in which said reinforcements comprise a ply of cables extending substantially radially of said sidewalls throughout their extent and narrower plies of cables in said upper and inner zones.

5. A pneumatic tire comprising a ply reinforcing tread, sidewalls extending inwardly from opposite edges of said tread and beads at the inner edges of said sidewalls, reinforcements of different rigidities in said sidewalls, about the inner one-half portion of each sidewall containing reinforcement rendering it more rigid than the remaining outer portion of said sidewall, and said reinforcements rendering a middle zone of said inner portion less rigid than an upper zone and an inner zone of the inner portion on opposite sides of said middle zone, said reinforcements in said inner portion of each sidewall comprising at least one ply of cables inclined to the radial planes of said tire and extending throughout said inner, middle and upper zones and narrower plies of inclined cables in said inner zone and upper zone on opposite sides of said middle zone.

6. A pneumatic tire comprising a ply reinforced tread, sidewalls extending inwardly from opposite edges of said tread and beads at the inner edges of said sidewalls, reinforcements of different rigidities in said sidewalls, about the inner one-half portion of each sidewall containing reinforcements rendering it more rigid than the remaining outer portion of said sidewall, and said reinforcements rendering a middle zone of said inner portion less rigid than an upper zone and an inner zone of the inner portion on opposite sides of said middle zone, said reinforcements in said inner portion of each sidewall comprising at least one folded ply of cables having one ply portion extending throughout said inner, middle and upper zones and another ply portion extending throughout and restricted to said upper zone, and another ply of cables in said inner zone.

7. A pneumatic tire comprising a ply reinforced tread, sidewalls extending inwardly from opposite edges of said tread and beads at the inner edges of said sidewalls, reinforcements of different rigidities in said sidewalls, about the inner one-half portion of each sidewall containing reinforcements rendering it more rigid than the remaining outer portion of said sidewall, and said reinforcements rendering a middle zone of said inner portion less rigid than an upper zone and an inner zone of the inner portion on opposite sides of said middle zone, said reinforcements in said inner half of each sidewall comprising at least one folded ply of cables having one ply portion extending throughout said inner, middle and upper zones and another ply portion extending from said bead outwardly in the sidewall, and another ply of cables in and restricted to said upper zone.

8. The tire set forth in claim 7 comprising a bead wire in each bead, said folded ply being folded around said bead wire.

9. A pneumatic tire comprising a ply reinforced tread, sidewalls extending inwardly from opposite edges of said tread and beads at the inner edges of said sidewalls, reinforcements of different rigidities in said sidewalls, about the inner one-half portion of each sidewall containing reinforcements rendering it more rigid than the remaining outer portion of said sidewall, and said reinforcements rendering a middle zone of said inner portion less rigid than an upper zone and an inner zone of the inner portion on opposite sides of said middle zone, said reinforcements comprising a ply of cables extending substantially radially of said sidewalls throughout their extent and narrower plies of cables in said upper and inner zones, and a layer of an elastomer having a modulus of elasticity of at least 800 g./mm.² extending throughout said inner, middle and upper zones.

10. A pneumatic tire comprising a ply reinforced tread, sidewalls extending inwardly from opposite edges of said tread and beads at the inner edges of said sidewalls, reinforcements of different rigidities in said sidewalls, about the inner one-half portion of each sidewall containing reinforcements rendering it more rigid than the remaining outer portion of said sidewall, and said reinforcements rendering a middle zone of said inner portion less rigid than an upper zone and an inner zone of the inner portion on opposite sides of said middle zone, said reinforcements comprising a layer of an elastomer having a modulus of elasticity of at least 800 gr./mm.² at 100% elongation extending throughout each sidewall and plies of cables in said upper and inner zones.

11. The tire set forth in claim 10 in which said reinforcements comprise an additional ply of cables extending through said inner, middle and upper zones.

12. A pneumatic tire comprising a ply reinforced tread, sidewalls extending inwardly from opposite edges of said tread and beads at the inner edges of said sidewalls, reinforcements of different rigidities in said sidewalls, about the inner one-half portion of each sidewall containing reinforcements rendering it more rigid than the remaining outer portion of said sidewall, and said reinforcements rendering a middle zone of said inner portion less rigid than an upper zone and an inner zone of the inner portion on opposite side of said middle zone, said reinforcements comprising a layer of an elastomer having a modulus of elasticity of at least 800 gr./mm.² at 100% elongation extending throughout said inner, middle and upper zones, and narrower plies of cables in said inner and upper zones.

References Cited by the Examiner
UNITED STATES PATENTS

| | | | |
|---|---|---|---|
| 2,958,359 | 11/1960 | Boussu et al. | 152—354 |
| 3,062,259 | 11/1962 | Boussu et al. | 152—356 |
| 3,077,915 | 2/1963 | Weber | 152—355 |

ARTHUR L. LA POINT, *Primary Examiner.*

C. W. HAEFELE, *Assistant Examiner.*